Aug. 25, 1942.   R. J. KEMP   2,293,739
RADIO DIRECTION FINDER
Filed Nov. 26, 1938   2 Sheets-Sheet 2
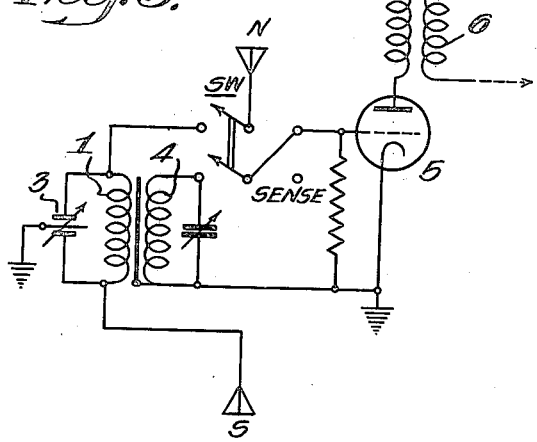
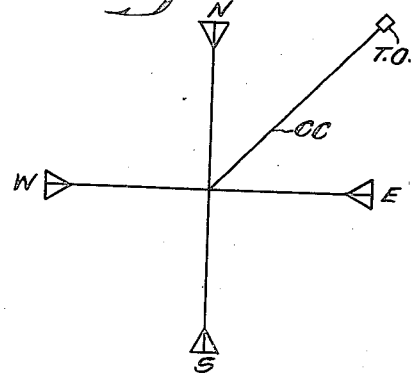
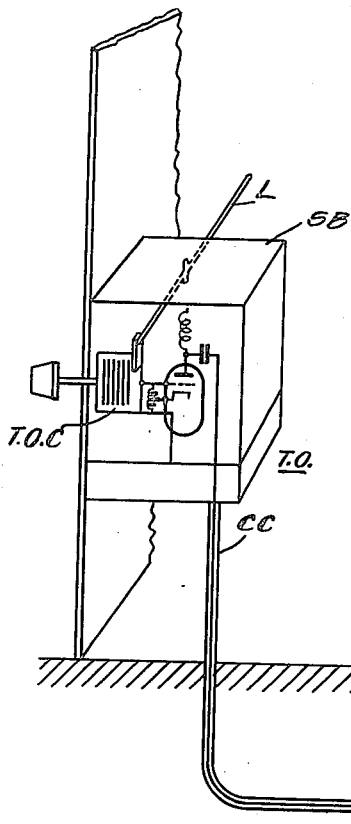
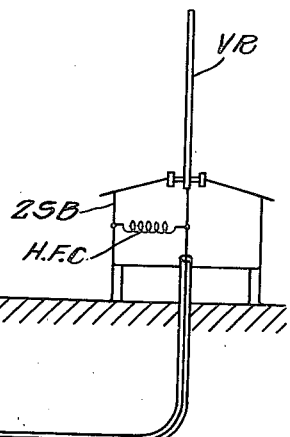
Inventor
Roland J. Kemp
By
Attorney Patented Aug. 25, 1942

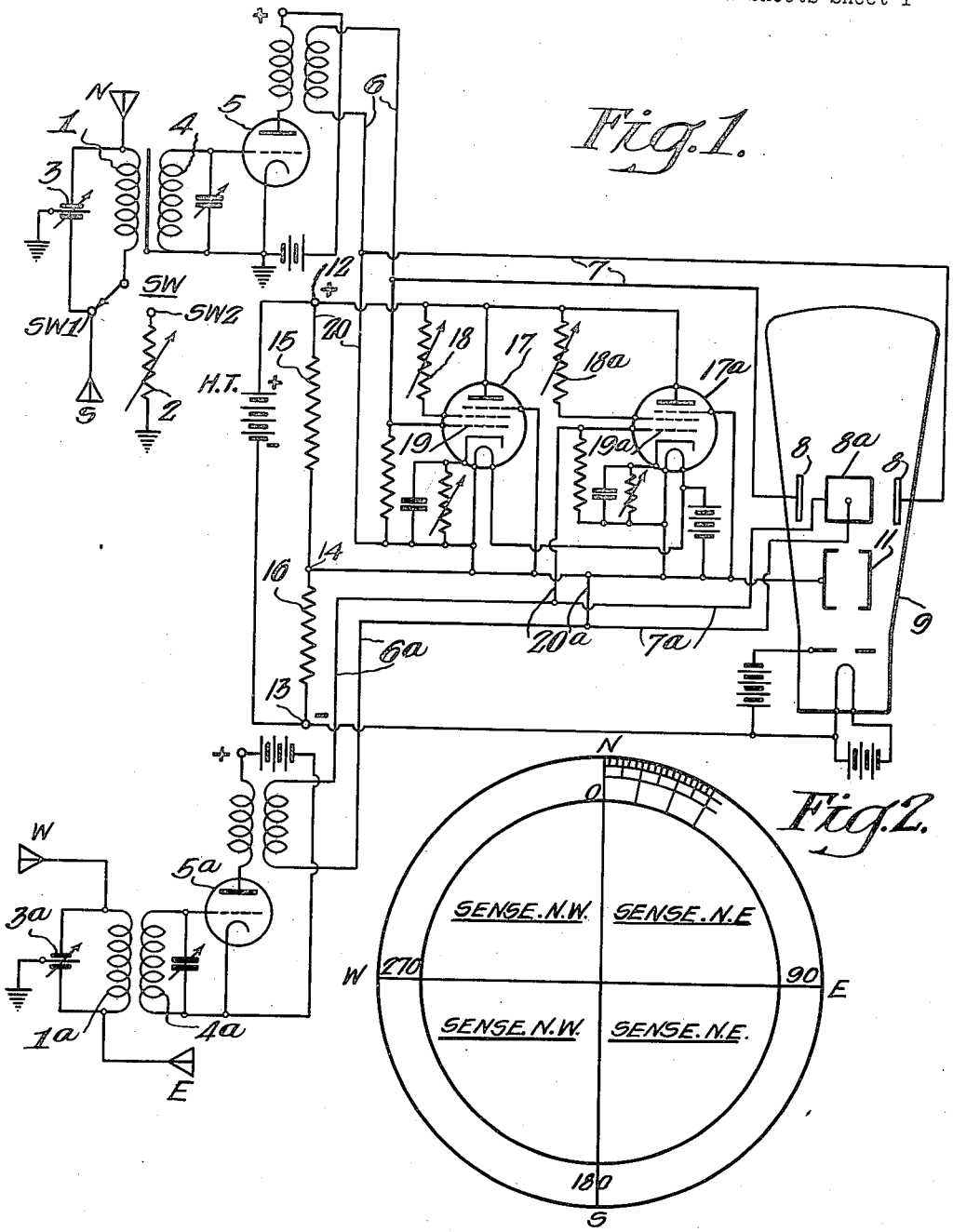

2,293,739

UNITED STATES PATENT OFFICE 2,293,739

RADIO DIRECTION FINDER

Roland John Kemp, Chelmsford, England, assignor to Radio Corporation of America, a corporation of Delaware Application November 26, 1938, Serial No. 242,633
In Great Britain December 1, 1937

4 Claims. (Cl. 250—11)

This invention relates to radio direction finders and more particularly to direct visually indicating radio direction finders of the kind wherein the direction of an incoming signal is resolved into two mutually perpendicular components, signals corresponding to these two components being applied to two mutually perpendicular deflecting systems of an indicating oscillograph so that the indication given thereby is the resultant of the two component inputs. Thus, an incoming signal may be received upon two mutually perpendicular frame aerials or their equivalent, the signals from the frames being separately amplified by amplifiers which have equal phase shifts, if any, and equal amplification factors. The amplified signals are then applied to the two mutually perpendicular pairs of deflector plates or other equivalent deflector devices of a cathode ray tube having a fluorescent screen.

In direction finders of the kind referred to the necessity of maintaining the two directional component signals at equal phase and the same relative amplitude makes it difficult to provide automatic gain control or limiter action in the two amplifiers without upsetting their relative amplification factors and, accordingly, with strong received signals, the indicator line in the cathode ray tube or other indicator oscillograph may extend over and beyond the scale. The first object of the invention is to provide means for automatically limiting the extent of the indicator line without upsetting the balance.

A system of the kind referred to as so far described will, of course, indicate direction but not sense and additional means must be provided for sense indication. One known method of obtaining sense indication is to provide switch means whereby the aerial system for one directional component—for example the North and South system—may be disconnected from its associated amplifier and a separate vertical aerial of the same effective height as the directional system it replaces, connected in the input circuit of the said amplifier. The result of this change in connections will, of course, be to shift the angular position of the cathode ray tube indication and the nature of the shift constitutes an indication of the sense. Thus, for example, if a signal is being received which gives a line of light on the tube screen extending from the N. E. quadrant, through the center, on to the S. W. quadrant and the sense switch is then operated the result being to give a small shift of the line tending to move it away from the center of the pair of "Sense N. E." quadrants, this indicates that the direction was from the N. E., whereas if it had been from the S. W. the line would have moved in the opposite direction or toward the center of the pair of "Sense N. E." quadrants. (See Sense markings Fig. 2.) This type of sense indicating arrangement however presents the defects that, owing to the capacity of the sense switch, it is difficult to maintain the necessary balance of the two directional aerial systems and it is also difficult to avoid coupling of the "sense" aerial (the vertical aerial) into the directional aerial circuits due to the switch capacity and the general proximity of the leads.

The second object of the invention is to provide a direction finder of the kind referred to having a sense indicating arrangement which shall not present these defects.

It is usual to provide, in association with a direction finder of the kind referred to, a test oscillator to facilitate adjustment of the component directional aerial system and associated amplifiers to the equal amplitude equal phase condition. The usual practice is to mount the oscillator externally with respect to the directional aerials and receiver proper, arranging it on a line making exactly 45° with the line of the N–S aerial system and the line of the E–W aerial system. This practice is inconvenient in that the test oscillator is not immediately available for use while it must be installed with great exactness at the correct position. A third object of the invention is to avoid these defects.

The first object of the invention is achieved by utilizing received signals to control the response sensitivity of the indicating oscillograph so as to reduce said sensitivity as the received signal strength increases beyond a predetermined maximum.

The second object of the invention is achieved by dispensing with the use of a separate "sense" aerial altogether and arranging a "sense" switch to disconnect one of two aerials which together constitute one of the two mutual perpendicular component directional aerial systems of the direction finder and simultaneously to earth the other of said two aerials through a phasing impedance such that the signal supplied by said other aerial, when a sense reading is being taken, is equal in phase and amplitude to the signal supplied from the other component directional aerial system for signals received along its line of maximum response.

The third object of the invention is achieved by mounting the test oscillator as a screened unit in the normally provided receiver—preferably with its tuning reactance gang controlled with the normal receiver tuning means, and connecting it by a screened and preferably buried feeder extending at 45° to the lines of N-S, E-W aerials, constituting mutually perpendicular component aerial systems to feed a vertical radiator positioned on this line.

The invention is illustrated in and further explained in connection with the accompanying drawings. Figure 1 is a schematic circuit diagram representing one embodiment of the invention; Figure 2 is an end view of the cathode ray tube screen and scale; Figure 3 is a circuit diagram of a modified switching arrangement; and Figures 4 and 5 are diagrams representing respectively a plan view of the test oscillator arrangement and the test oscillator circuit connections.

Referring first to Fig. 1, there are employed four equally spaced equal vertical aerials N. E. S. W. arranged at the corners of a square and constituting two mutually perpendicular Adcock systems. Of these aerials the N (north) aerial is connected to one end of an aerial input coil 1 and the S (south) aerial is connected to one contact SW1 of a two-position switch SW the armature of which is connected to the other end of the aerial input coil 1. The remaining contact SW2 of the switch is connected to earth through a phasing resistance 2.

The switch contact, SW1, and the N aerial end of the aerial input coil 1 are connected to the outer plates of a differential condenser 3 whose mid-plate is earthed and which is used to balance the pick-up of the N and S aerials. The aerial coil 1 is coupled to the input coil 4 of an amplifier 5 whose output is fed via leads 6 and 7 to one pair of deflector plates 8 of an indicator cathode ray tube 9.

The E and W aerials are similarly arranged to feed via coils 1a, 4a, amplifier 5a and leads 6a, 7a to the other pair of cathode ray tube deflector plates 8a but in this case there is no switch or phasing resistance, the outer plates of a differential condenser 3a being permanently connected to the ends of the aerial coil 1a. The switch SW is the sense switch and for sense reading it is moved to disconnect the S aerial and earth the N aerial through the phasing resistance 2 which is of such magnitude that the amplitude supplied to the associated amplifier 5 by the N aerial in this position of the switch SW is the same as the amplitude supplied by the E-W aerials into their associated amplifier 5a. Preferably the direction indicating scale is photographed on the screen of the cathode ray tube 9. This screen is preferably marked out as indicated in Fig. 2 in quadrants separately lettered to indicate the correct position of the bearing line (not shown) of the particular quadrant when the switch SW is moved to "sense." Thus, in the particular case described and illustrated the NW and SW quadrants are marked "Sense NW" and the NE and SE quadrants are marked "Sense NE."

The anode 11 of the electron gun system of the cathode ray tube is fed with potential from a source H. T. which is connected at 12, 13 across a potentiometer resistance 15, 16. The anode receives its potential from a tap 14 which divides said potentiometer into two parts 15, 16; the part 16, (the less positive part) supplies the anode potential. The more positive part 15 of said potentiometer is shunted by the anode-cathode connections of two valves 17, 17a which are preferably screen grid valves or (as shown) pentodes and receive preferably individually adjustable screen grid potentials from said potentiometer through adjustable resistances 18, 18a. The control grids 19, 19a of these two valves are biased heavily and preferably adjustably negative, and are connected the one to receive (over wires 6, 20) positive signals from the output of the N-S amplifier 5, and the other to receive (over wires 6a and 20a) positive signals from the output of the E-W amplifier 5a.

Thus when these valves 17, 17a receive signals on their grids 19, 19a they become conductive to pass anode current and, being in shunt with the more positive part 15 of the potentiometer, cause a reduction in the anode potential applied to the electron gun anode 11. Since the sensitivity of the tube depends upon the gun anode potential, its sensitivity will be decreased and it is possible so to arrange the operating parameters so that the indicator line on the tube screen does not substantially increase in length for signal strengths beyond a predetermined value. The valves 17, 17a are so biased that they become conductive to decrease tube sensitivity only when a substantially "full line" deflecting signal is present. The use of two sensitivity controlling valves 17, 17a is not necessary for one connected to receive on its control grid signals from both amplifiers, since both channels are arranged to have equal phase shifts, and amplification factors, could be used.

Fig. 3 shows a preferred modification of Fig. 1, the modification concerning only the sense switch arrangement. In Fig. 3 only those parts are shown which are necessary to an understanding of the way in which Fig. 1 is modified, the circuits not shown in Fig. 3 being as in Fig. 1. As will be apparent, the difference between Figs. 1 and 3 is that in the latter figure the N aerial is switched directly on to the grid of the valve 5. This is a material advantage because one effect of switching (as in Fig. 1) at the primary coil 1 of the aerial transformer 1, 4, is to detune the secondary 4, thus causing a phase shift which transforms the indicator line on the cathode ray tube screen into an ellipse when the switch SW is moved to the "sense" position. In the arrangement of Fig. 3 this defect is substantially reduced since the transformer 1, 4 is disconnected when the switch SW is thrown to the right (in Fig. 3) to read "sense."

Referring to Fig. 4, a test oscillator T. O., represented purely schematically, and tuned by a variable condenser T. O. C. which is gang controlled over link L with the other tuning controls (not shown) of the installation, is incorporated in the receiver proper and is carefully screened from the other (not shown), nearby, circuits by a screening box S. B. The output of this oscillator is fed to a screened low loss concentric cable CC, buried underground which extends at 45° to the lines of the N-S and E-W aerials (see Fig. 5). At the far end of this cable is a screened box 2SB in which is situated a high frequency choke, HFC. On the top of the box is mounted a vertical rod, VR, which is coupled to the choke to act as a high frequency radiator, the "inner" or "live" conductor of the cable being connected to one end of the choke HFC and the lower end of the rod VR, the other end of the choke HFC being connected to the box, 2SB.

The main advantages of the above described arrangements are:

(1) Effective and simple automatic limitation of the length of the indicator line is obtained.

(2) The sense reading apparatus is simple and economical, there being no specially provided sense vertical aerial.

(3) There is no reversal of "sense" above and below the natural resonance point of the directional aerials. If a separate vertical aerial—whose characteristics would naturally differ from those of the directional aerials—is used, a "sense" reversal is shown as the directional aerial resonance point is passed.

(4) Difficulties due to inherent coupling between separate sense and directional aerials is avoided.

(5) There is only one switch for "sense" taking and that a simple two-position switch.

(6) Residual capacity is small so that balance is easily obtained with a quite small balancing capacity.

(7) The test oscillator is in the most convenient place and feeds a radiator whose position with respect to the main aerials can be easily and accurately fixed and is permanent.

I claim as my invention:

1. A direction finder including, in combination, a pair of crossed pattern directional aerial systems, a pair of channels having substantially equal phase shifts and amplification factors respectively coupled to said pairs of aerials, a cathode ray tube including deflecting elements and anode and cathode electrodes, means for applying the signals from said pair of channels respectively to the deflecting elements of said tube, a high tension power source for said tube including a potentiometer, means connecting the anode and cathode electrodes of said cathode ray tube to said potentiometer, an electron discharge device including a cathode and anode connected to said potentiometer, and means for applying the received signals to said device so that the connection of the cathode and anode of said electron discharge device to said potentiometer offers an impedance varying as a function of said received signal amplitude.

2. A direction finder including, in combination, a pair of crossed directional antenna systems, each including two vertical aerials, a cathode ray oscillograph including deflecting elements, means for applying signals from said antenna systems to said deflecting elements to produce a bi-directional indication of the wave front of said signals, a phasing impedance, and a "sense" switch for disconnecting one of the vertical aerials of one of said pairs and for earthing the other vertical aerial through said phasing impedance, and means for adjusting said phasing impedance to a value in which the "sense" connection supplies a signal substantially equal in phase and amplitude to the signal supplied from the other of said pair of antenna systems.

3. A direction finder comprising two mutually perpendicular directional aerial systems, a pair of channels having substantially equal phase shifts and amplification factors connected respectively to said aerial systems, a cathode ray tube oscillograph including mutually perpendicular ray deflecting systems, means for applying the signals from said pair of channels respectively to the mutually perpendicular deflecting systems of said cathode ray tube oscillograph, means for utilizing signals derived from at least one of said aerial systems to control the response sensitivity of the indicating oscillograph so as to reduce said sensitivity as the received signal strength increases beyond a predetermined maximum, and in which each of said mutually perpendicular aerial systems includes a pair of vertical aerials, a phasing impedance, a "sense" switch for disconnecting one of the vertical aerials of one of said pairs and for earthing the other vertical aerial through said phasing impedance, and means for adjusting said phasing impedance to a value in which the "sense" connection supplies a signal substantially equal in phase and amplitude to the signal supplied from the other of said pairs of aerial systems.

4. A direction finder comprising two mutually perpendicular directional aerial systems, a pair of channels having substantially equal phase shifts and amplification factors connected respectively to said aerial systems, a cathode ray tube oscillograph including mutually perpendicular ray deflecting systems, means for applying the signals from said pair of channels respectively to the mutually perpendicular deflecting systems of said cathode ray tube oscillograph, means for utilizing signals derived from at least one of said aerial systems to control the response sensitivity of the indicating oscillograph so as to reduce said sensitivity as the received signal strength increases beyond a predetermined maximum, and in which each of said mutually perpendicular aerial systems includes a pair of vertical antennas and a transformer coupled thereto, a "sense" switch connected to one of said transformers and to one of said vertical antennas, and so arranged that said transformer and the other of said vertical antennas may be disconnected from said receiver for taking "sense" indications.

ROLAND JOHN KEMP.